United States Patent
Yan et al.

(10) Patent No.: US 12,219,385 B2
(45) Date of Patent: Feb. 4, 2025

(54) HYBRID AUTOMATIC REPEAT REQUEST FEEDBACK METHOD AND DEVICE

(71) Applicant: China Academy of Information and Communications, Beijing (CN)

(72) Inventors: Zhiyu Yan, Beijing (CN); Zhiqin Wang, Beijing (CN); Ying Du, Beijing (CN); Xiaofeng Liu, Beijing (CN); Guiming Wei, Beijing (CN); Fei Xu, Beijing (CN); Xia Shen, Beijing (CN); Huiying Jiao, Beijing (CN)

(73) Assignee: China Academy of Information and Communications, Beijing (CN)

( * ) Notice: Subject to any disclaimer, the term of this patent is extended or adjusted under 35 U.S.C. 154(b) by 375 days.

(21) Appl. No.: 17/635,750

(22) PCT Filed: Aug. 14, 2020

(86) PCT No.: PCT/CN2020/109239
§ 371 (c)(1),
(2) Date: Feb. 16, 2022

(87) PCT Pub. No.: WO2021/032005
PCT Pub. Date: Feb. 25, 2021

(65) Prior Publication Data
US 2022/0338223 A1 Oct. 20, 2022

(30) Foreign Application Priority Data
Aug. 16, 2019 (CN) .......................... 201910760196.7

(51) Int. Cl.
*H04L 1/1812* (2023.01)
*H04L 1/1829* (2023.01)
(Continued)

(52) U.S. Cl.
CPC .......... *H04W 28/04* (2013.01); *H04L 1/1812* (2013.01); *H04L 1/1861* (2013.01);
(Continued)

(58) Field of Classification Search
CPC .......... H04L 1/12–1896; H04L 5/0001–0098; H04W 8/18–245; H04W 24/02–10;
(Continued)

(56) References Cited

U.S. PATENT DOCUMENTS

2020/0413411 A1* 12/2020 Khoshnevisan ...... H04L 1/1812
2021/0021382 A1* 1/2021 Chien .................. H04L 1/1812
(Continued)

FOREIGN PATENT DOCUMENTS

| CN | 103188061 A | 7/2013 |
| CN | 103516487 A | 1/2014 |

(Continued)

OTHER PUBLICATIONS

Asia Pacific Telecom, "Remaining Issues on DL SPS Enhancements," 3GPP TSG-RAN WG1 Meeting #100, R1-2000776, Feb. 14, 2020.
(Continued)

Primary Examiner — Timothy J Weidner
(74) Attorney, Agent, or Firm — IceMiller LLP

(57) ABSTRACT

Disclosed in the present application is a hybrid automatic repeat request feedback method, which comprises the steps that: an HARQ-ACK codebook includes HARQ-ACK information of M PDSCHs, the M PDSCHs are all scheduled by first-type PDCCHs, and the first-type PDCCHs are used for activating an SPS configuration; the order of the HARQ-ACK information of the M PDSCHs in the HARQ-ACK codebook is arranged according to at least one parameter value among cell indexes, BWP indexes, SPS configuration indexes and PDSCH transmission moments of the M
(Continued)

PDSCHs. The embodiments of the present application also provide a hybrid automatic repeat request feedback method with the participation of second-type PDCCHs for releasing SPS and dynamically configured third-type PDCCHs. The present application also provides a terminal device and a network device to which the method is applied. The present application solves the problem of how to generate an HARQ-ACK codebook when there are multiple PDSCHs in an SPS configuration condition.

16 Claims, 4 Drawing Sheets

(51) Int. Cl.
| | | |
|---|---|---|
| *H04L 1/1867* | (2023.01) | |
| *H04L 5/00* | (2006.01) | |
| *H04W 28/02* | (2009.01) | |
| *H04W 28/04* | (2009.01) | |
| *H04W 72/0446* | (2023.01) | |
| *H04W 72/0453* | (2023.01) | |
| *H04W 72/11* | (2023.01) | |
| *H04W 72/1273* | (2023.01) | |
| *H04W 72/232* | (2023.01) | |
| *H04W 72/566* | (2023.01) | |
| *H04W 84/02* | (2009.01) | |
| *H04W 88/02* | (2009.01) | |
| *H04W 88/08* | (2009.01) | |
| *H04W 92/02* | (2009.01) | |
| *H04W 92/10* | (2009.01) | |

(52) U.S. Cl.
CPC .......... *H04L 1/1864* (2013.01); *H04L 1/1893* (2013.01); *H04L 1/1896* (2013.01); *H04L 5/0053* (2013.01); *H04L 5/0055* (2013.01); *H04L 5/0098* (2013.01); *H04W 28/0273* (2013.01); *H04W 72/0446* (2013.01); *H04W 72/0453* (2013.01); *H04W 72/11* (2023.01); *H04W 72/1273* (2013.01); *H04W 72/232* (2023.01); *H04W 72/569* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 28/02–26; H04W 48/02–20; H04W 56/001–0025; H04W 72/02–569; H04W 74/002–008; H04W 84/02–16; H04W 88/02–12; H04W 92/02–04; H04W 92/10
See application file for complete search history.

(56) References Cited

U.S. PATENT DOCUMENTS

| | | | | |
|---|---|---|---|---|
| 2022/0159691 | A1* | 5/2022 | Chen | H04L 1/1812 |
| 2022/0239445 | A1* | 7/2022 | Yoshioka | H04L 1/1812 |

FOREIGN PATENT DOCUMENTS

| | | |
|---|---|---|
| CN | 106160983 A | 11/2016 |
| CN | 107347002 A | 11/2017 |
| CN | 110166180 A | 8/2019 |
| CN | 110519025 A | 11/2019 |
| CN | 110557227 A | 12/2019 |
| CN | 110830151 A | 2/2020 |
| CN | 111106903 A | 5/2020 |
| WO | 2014/092435 A1 | 6/2014 |

OTHER PUBLICATIONS

Asia Pacific Telecom, "Remaining Issues on DL SPS Enhancements," 3GPP TSG-RAN WG1 Meeting #100bis, R1-2002485, Apr. 10, 2020.
ZTE, "Remaining RAN1 Issues on SPS Enhancements," 3GPP TSG RAN WG1 #100bis, R1-2001617, Apr. 11, 2020.

* cited by examiner

Arranged according to at least one parameter value among cell indexes, BWP indexes, SPS configuration indexes and PDSCH transmission moments of the M PDSCHs, an HARQ-ACK codebook includes HARQ-ACK information of M PDSCHs, wherein the M PDSCHs are all scheduled by first-type PDCCHs, and the first-type PDCCHs are used for activating SPS configurations

101 arranged according to at least one parameter value among cell indexes, BWP indexes, SPS configuration indexes and PDSCH transmission moments of the M PDSCHs, and cell indexes, BWP indexes, SPS configuration indexes aND virtual PDSCH transmission moments corresponding to the SPS configurations respectively released by the N second-type PDCCHs, the HARQ-ACK codebook further includes HARQ-ACK information of N second-type PDCCHs, wherein the second-type PDCCH is used for releasing the SPS configuration

102 the HARQ-ACK codebook further includes HARQ-ACK information of eaCH of the P PDSCHs scheduled by third-type PDCCHs, wherein the third-type PDCCHs are used for dynamically scheduling the PDSCHs, arranged according to at least one parameter value among the levels of the M PDSCHs, the N second-type PDCCHs and the P PDSCHs, cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released by the N second-type PDCCHs

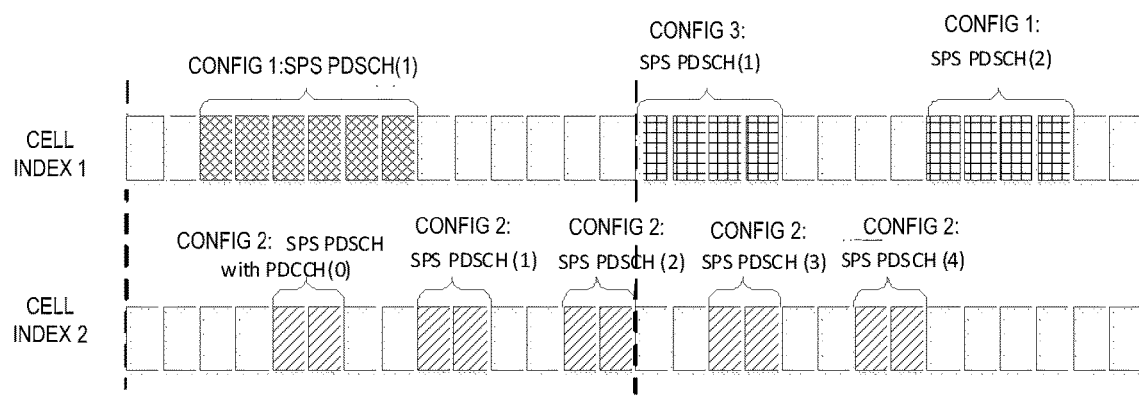

FIG.2

HYBRID AUTOMATIC REPEAT REQUEST FEEDBACK METHOD AND DEVICE

CROSS-REFERENCE TO RELATED APPLICATIONS

The present application is a National Stage of International Patent Application No. PCT/CN2020/109239, filed on Aug. 14, 2020, which claims priority to the Chinese Patent Application No. 201910760196.7, filed to the China National Intellectual Property Administration on Aug. 16, 2019 and entitled "HYBRID AUTOMATIC REPEAT REQUEST FEEDBACK METHOD AND DEVICE," the disclosures of which are incorporated herein by reference in their entirety.

FIELD

The present application relates to the technical field of mobile communications, in particular to a method and device for generating a codebook in response to a plurality of semi-persistent scheduling hybrid automatic repeat requests.

BACKGROUND

During dynamic scheduling, a network device (e.g., a base station) sends a physical downlink control channel (PDCCH) to a terminal device (UE) every time a PDSCH or a PUSCH is scheduled. In semi-persistent scheduling (SPS), by sending a physical downlink control channel once, the network device periodically allocates the resource of the PDSCH or the PUSCH to the terminal device. Every time a period (e.g., 10 ms) passes, the terminal device receives or sends data by using the SPS resource.

SPS configuration information is configured by the network device to the terminal device by means of RRC signaling. After the terminal device receives the configuration information, the network device activates an SPS configuration by means of a PDCCH, such that the terminal device can receive or send data on a corresponding resource. If the terminal device receives an indication that the network device releases the SPS configuration by means of the PDCCH, the terminal device stops receiving or sending data on the resource corresponding to the SPS configuration.

The feature "allocate once, use multiple times" of the SPS reduces the PDCCH overhead. A first PDSCH after the SPS configuration is activated has a corresponding PDCCH, and can be called "PDSCH transmission with corresponding PDCCH scheduling", and the other PDSCH constructed and sent according to the SPS configuration is called "PDSCH transmission without corresponding PDCCH scheduling".

For feedback of downlink data, there are two ways to generate an HARQ-ACK codebook in the prior art: one is a semi-static codebook, and the size of the HARQ-ACK codebook is determined according to a predetermined or RRC-configured parameter. The other is a dynamic codebook, the HARQ-ACK codebook will change with a data scheduling situation, and the dynamic codebook is generated based on a downlink assignment index (DAI) field in DCI.

If HARQ-ACK information at an HARQ-ACK information feedback moment only includes the PDSCH transmission without corresponding PDCCH scheduling for the SPS configuration, the HARQ-ACK codebook only needs to include the HARQ-ACK information of the PDSCH.

According to the prior art, if the HARQ-ACK information at the HARQ-ACK information feedback moment includes an ordinary PDSCH, PDSCH for activating SPS, PDCCH transmission for releasing SPS, and PDSCH transmission without corresponding PDSCH scheduling for the SPS configuration, the HARQ-ACK information in the HARQ-ACK semi-static codebook is sorted according to the order of candidate PDSCH sets of each cell; the order of the HARQ-ACK information in the HARQ-ACK dynamic codebook is: first, the HARQ-ACK information in the order determined according to the respective DAI of the PDCCH for scheduling the ordinary PDSCH, the PDCCH for activating the SPS, and the PDCCH for releasing the SPS, and then the HARQ-ACK information of PDSCH without corresponding PDCCH scheduling.

Services of a time-sensitive network have multiple periods and urgency-priority data flows, and the time-sensitive network also needs to support services with low latency requirements while supporting occasional bursts of urgent services. Therefore, an NR system will support the terminal device to be configured with multiple separate independent SPS parameters. The NR system will also support the terminal device to be configured with a service type having a very short period, for example, the period is 2 symbols, 7 symbols or 1 time slot. The terminal device supports multiple SPS configuration parameters, and the terminal device supports the SPS configuration having a very short period, which will cause the terminal device to feed back the HARQ-ACK codebook composition of the PDSCH of the SPS configuration in a different way from the prior art.

Specifically, the terminal device needs to feed back the HARQ-ACK information in the HARQ-ACK codebook, including a combination for the following information types:

PDSCH with corresponding PDCCH scheduling, including ordinary PDSCH and data transmission for activating the SPS configuration;

PDCCH transmission for releasing the SPS configuration;

PDSCH transmission without corresponding PDCCH scheduling for the SPS configuration, which can comprise multiple PDSCHs of one SPS configuration, and/or PDSCHs of multiple SPS configurations.

If the HARQ-ACK codebook includes HARQ-ACK information corresponding to PDSCHs of multiple SPS configurations, and/or multiple PDSCHs of each SPS configuration, there is currently no prior art for how to sort the HARQ-ACK information in the HARQ-ACK codebook. As a result, the HARQ process of multiple SPS configurations for the terminal device cannot be completed, which affects the system transmission efficiency and bit error rate performance.

SUMMARY

The embodiments of the present application provide a hybrid automatic repeat request feedback method and device, which solve the problem of how to generate an HARQ-ACK codebook when there are multiple PDSCHs in an SPS configuration condition.

In a first aspect, provided in the embodiments of the present application is a hybrid automatic repeat request feedback method. An HARQ-ACK codebook includes HARQ-ACK information of M PDSCHs, wherein the M PDSCHs are all scheduled by first-type PDCCHs, and the first-type PDCCHs are used for activating an SPS configuration. At least two of the M PDSCHs belong to the same SPS configuration, and/or at least two of the M PDSCHs belong to different SPS configurations. The order of the HARQ-ACK information of the M PDSCHs in the HARQ-ACK codebook is arranged according to at least one parameter value among cell indexes, BWP indexes, SPS configuration indexes and PDSCH transmission moments of the M PDSCHs.

Further, the HARQ-ACK codebook includes HARQ-ACK information of N second-type PDCCHs, wherein the second-type PDCCHs are used for releasing the SPS configuration, N≥1. The second-type PDCCH comprises a reference field, wherein the reference field is used for indicating the transmission moment of a virtual PDSCH corresponding to the released SPS configuration. The order of the HARQ-ACK information of the M PDSCHs and the HARQ-ACK information of the N second-type PDCCHs in the HARQ-ACK codebook is arranged according to at least one parameter value among cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released by the N second-type PDCCHs.

Preferably, the position of the reference field in the second-type PDCCH is the same as the position of a time domain resource assignment field in the first-type PDCCH, wherein the time domain resource assignment field is used in the first-type PDCCH to indicate the PDSCH transmission moment for activating SPS.

Further, in any of the foregoing embodiments, the HARQ-ACK codebook further includes HARQ-ACK information of each of the P PDSCHs scheduled by third-type PDCCHs, wherein the third-type PDCCHs are used for dynamically scheduling the PDSCHs. The order of the HARQ-ACK information of the M PDSCHs, the HARQ-ACK information of the N second-type PDCCHs and the HARQ-ACK information of each of the P PDSCHs scheduled by third-type PDCCHs in the HARQ-ACK codebook is arranged according to at least one parameter value among the levels of the M PDSCHs, the N second-type PDCCHs and the P PDSCHs, cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released by the N second-type PDCCHs. Among the M PDSCHs, the first PDSCH transmitted after the PDCCHs activate the SPS configuration is of a first level, and the second and subsequent PDSCHs transmitted after the PDCCHs activate the SPS configuration are of a second level; the level of the N second-type PDCCHs is the first level, and the level of the P PDSCHs is the first level.

The method according to any one of the embodiments in the first aspect of the present application is applied to a terminal device, and comprises the following steps:
receiving the first-type PDCCHs;
determining the HARQ-ACK codebook according to the order of the HARQ-ACK information; and
sending the HARQ-ACK codebook.

Further, the method further comprises the following steps:
receiving the second-type PDCCHs, or receiving the first-type PDCCHs and the second-type PDCCHs;
determining the HARQ-ACK codebook according to the order of the HARQ-ACK information; and
sending the HARQ-ACK codebook.

Further, the method further comprises the following steps:
receiving at least one type of the first-type PDCCHs and the second-type PDCCHs, and the third-type PDCCHs;
determining the HARQ-ACK codebook according to the order of the HARQ-ACK information; and
sending the HARQ-ACK codebook.

The method according to any one of the embodiments in the first aspect of the present application is applied to a network device, and comprises the following steps:
sending the first-type PDCCHs; and
receiving the HARQ-ACK codebook according to the order of the HARQ-ACK information.

Further, the method further comprises the following steps:
sending the first-type PDCCHs, or sending the first-type PDCCHs and the second-type PDCCHs; and
receiving the HARQ-ACK codebook according to the order of the HARQ-ACK information.

Further, the method further comprises the following steps:
sending at least one type of the first-type PDCCHs and the second-type PDCCHs, and the third-type PDCCHs; and
receiving the HARQ-ACK codebook according to the order of the HARQ-ACK information.

In a second aspect, further provided in the embodiments of the present application is a terminal device, which is used for scheduling of multi-SPS configurations, and comprises: a downlink receiving module and an uplink sending module.

The downlink receiving module is used for receiving first-type PDCCHs, wherein the first-type PDCCHs are used for activating the SPS configurations; M PDSCHs are all scheduled by the first-type PDCCH; and at least two of the M PDSCHs belong to the same SPS configuration, and/or at least two of the M PDSCHs belong to different SPS configurations.

The uplink sending module is used for sending an HARQ-ACK codebook at a target time, wherein the HARQ-ACK codebook includes HARQ-ACK information of the M PDSCHs, and the order of the HARQ-ACK information of the M PDSCHs in the HARQ-ACK codebook is arranged according to at least one parameter value among cell indexes, BWP indexes, SPS configuration indexes and PDSCH transmission moments of the M PDSCHs.

Further, the downlink receiving module is further used for receiving second-type PDCCHs, wherein the second-type PDCCHs are used for releasing the SPS configurations, N≥1. The second-type PDCCH comprises a reference field, wherein the reference field is used for indicating the transmission moment of a virtual PDSCH corresponding to the released SPS configuration. The HARQ-ACK codebook includes HARQ-ACK information of N second-type PDCCHs. The order of the HARQ-ACK information of the M PDSCHs and the HARQ-ACK information of the N second-type PDCCHs in the HARQ-ACK codebook is arranged according to at least one parameter value among cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released by the N second-type PDCCHs.

Preferably, the position of the reference field in the second-type PDCCH is the same as the position of a time domain resource assignment field in the first-type PDCCH, wherein the time domain resource assignment field is used in the first-type PDCCH to indicate the PDSCH transmission moment for activating SPS.

Further, the downlink receiving module is further used for receiving third-type PDCCHs; the third-type PDCCHs are used for dynamically scheduling PDSCHs; and the HARQ-ACK codebook includes HARQ-ACK information of each of the P PDSCHs scheduled by third-type PDCCHs. The order of the HARQ-ACK information of the M PDSCHs, the HARQ-ACK information of the N second-type PDCCHs and the HARQ-ACK information of the P PDSCHs scheduled by the third-type PDCCHs in the HARQ-ACK codebook is arranged according to at least one parameter value among the levels of the M PDSCHs, the N second-type PDCCHs and the P PDSCHs, cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released by the N second-type PDCCHs. Among the M PDSCHs, the first PDSCH transmitted after the PDCCHs activate the SPS configuration is of a first level, and the second and subsequent PDSCHs transmitted after the PDCCHs activate the SPS configuration are of a second level; the level of the N second-type PDCCHs is the first level, and the level of the P PDSCHs is the first level.

In a third aspect, further provided in the embodiments of the present application is a network device, which is used for scheduling of multi-SPS configurations, and comprises: a downlink sending module and an uplink receiving module.

The downlink sending module is used for sending first-type PDCCHs, wherein the first-type PDCCHs are used for activating the SPS configurations. M PDSCHs are all scheduled by the first-type PDCCH. At least two of the M PDSCHs belong to the same SPS configuration, and/or at least two of the M PDSCHs belong to different SPS configurations.

The uplink receiving module is used for receiving an HARQ-ACK codebook, wherein the HARQ-ACK codebook includes HARQ-ACK information of the M PDSCHs, and the order of the HARQ-ACK information of the M PDSCHs in the HARQ-ACK codebook is arranged according to at least one parameter value among cell indexes, BWP indexes, SPS configuration indexes and PDSCH transmission moments of the M PDSCHs.

Further, the downlink sending module is further used for sending second-type PDCCHs, wherein the second-type PDCCHs are used for releasing the SPS configurations, N≥1. The second-type PDCCH comprises a reference field, wherein the reference field is used for indicating the transmission moment of a virtual PDSCH corresponding to the released SPS configuration. The HARQ-ACK codebook includes HARQ-ACK information of N second-type PDCCHs. The order of the HARQ-ACK information of the M PDSCHs and the HARQ-ACK information of the N second-type PDCCHs in the HARQ-ACK codebook is arranged according to at least one parameter value among cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released by the N second-type PDCCHs.

Preferably, the position of the reference field in the second-type PDCCH is the same as the position of a time domain resource assignment field in the first-type PDCCH, wherein the time domain resource assignment field is used in the first-type PDCCH to indicate the PDSCH transmission moment for activating SPS.

Further, the downlink sending module is further used for sending third-type PDCCHs; the third-type PDCCHs are used for dynamically scheduling PDSCHs; and the HARQ-ACK codebook includes HARQ-ACK information of each of the P PDSCHs scheduled by third-type PDCCHs. The order of the HARQ-ACK information of the M PDSCHs, the HARQ-ACK information of the N second-type PDCCHs and the HARQ-ACK information of each of the P PDSCHs scheduled by third-type PDCCHs in the HARQ-ACK codebook is arranged according to at least one parameter value among the levels of the M PDSCHs, the N second-type PDCCHs and the P PDSCHs, cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released of the N second-type PDCCHs. Among the M PDSCHs, the first PDSCH transmitted after the PDCCHs activate the SPS configuration is of a first level, and the second and subsequent PDSCHs transmitted after the PDCCHs activate the SPS configuration are of a second level; the level of the N second-type PDCCHs is the first level, and the level of the P PDSCHs is the first level.

In the embodiments of the first aspect, the second aspect and the third aspect of the present application, the following technical solutions can be further implemented:

Preferably, the order of the HARQ-ACK information of the M PDSCHs in the HARQ-ACK codebook is firstly arranged according to the cell indexes respectively corresponding to the PDSCHs; if the cell index values are the same, the order is further arranged according to the BWP indexes respectively corresponding to the PDSCHs; if the BWP indexes are the same, the order is further arranged according to the SPS configuration indexes respectively corresponding to the PDSCHs; and if the SPS configuration indexes are the same, the order is further arranged according to the respective transmission moments of the PDSCHs.

Alternatively, the order of the HARQ-ACK information of the M PDSCHs in the HARQ-ACK codebook is firstly arranged according to the cell indexes respectively corresponding to the PDSCHs; if the cell index values are the same, the order is further arranged according to the BWP indexes respectively corresponding to the PDSCHs; and if the BWP indexes are the same, the order is further arranged according to the respective transmission moments of the PDSCHs.

Preferably, the order of the HARQ-ACK information of the M PDSCHs and the HARQ-ACK information of the N second-type PDCCHs in the HARQ-ACK codebook is firstly arranged according to the cell indexes; if the cell index values are the same, the order is further arranged according to the BWP indexes; if the BWP indexes are the same, the order is further arranged according to the SPS configuration indexes; and if the SPS configuration indexes are the same, the order is further arranged according to the PDSCH transmission moments or the virtual PDSCH transmission moments.

Alternatively, the order of the HARQ-ACK information of the M PDSCHs and the HARQ-ACK information of the N second-type PDCCHs in the HARQ-ACK codebook is firstly arranged according to the cell indexes; if the cell index values are the same, the order is further arranged according to the BWP indexes; and if the BWP indexes are the same, the order is further arranged according to the PDSCH transmission moments or the virtual PDSCH transmission moments.

Preferably, the order of the HARQ-ACK information of the M PDSCHs, the HARQ-ACK information of the N second-type PDCCHs and the HARQ-ACK information of the P PDSCHs scheduled by the third-type PDCCHs in the HARQ-ACK codebook is firstly arranged according to the levels corresponding to the PDSCHs: first comes the HARQ-ACK information of a first-level PDSCH or PDCCH, followed by the HARQ-ACK information of a second-level PDSCH; if there is more than one first-level PDSCH or PDCCH, the order of respective HARQ-ACK information of a first-level channel in the HARQ-ACK codebook is determined according to a downlink assignment index (DAI) in each of the PDCCHs corresponding to the first-level channel; if there is more than one second-level PDSCH, the order of HARQ-ACK information of second-level PDSCHs in the HARQ-ACK codebook is determined according to at least one parameter value among cell indexes, BWP indexes, SPS configuration indexes and PDSCH transmission moments of the second-level PDSCHs.

The above-mentioned at least one technical solution adopted in the embodiments of the present application can achieve the following beneficial effects:

If a terminal device supports to be configured with multiple SPS configuration parameters and/or the terminal device supports an SPS configuration with a very short period, it is possible that a target HARQ-ACK codebook includes at least one of HARQ-ACK information of at least two PDSCHs of the same SPS configuration, HARQ-ACK information of a PDSCH group corresponding to at least two SPS configurations, and HARQ-ACK information corresponding to a PDCCH used for releasing the SPS configuration. For this kind of HARQ-ACK codebook, the sorting rule of HARQ-ACK information therein is designed in the present invention. The HARQ process in which the terminal device is configured with multiple SPS configurations is completed, and the system transmission efficiency and bit error rate performance are improved.

BRIEF DESCRIPTION OF THE DRAWINGS

The drawings described herein are used to provide further understanding of the present application and constitute a part of the present application. The exemplary embodiments of the present application and the description thereof are used to explain the present application, and do not constitute an improper limitation on the present application. In the drawings:

FIG. 1 is a flowchart of an embodiment of a method according to the present invention;

FIG. 2 is a schematic diagram of an embodiment of codebook sorting under the condition that first-type PDCCHs are included;

DETAILED DESCRIPTION OF THE EMBODIMENTS

Figure 3:
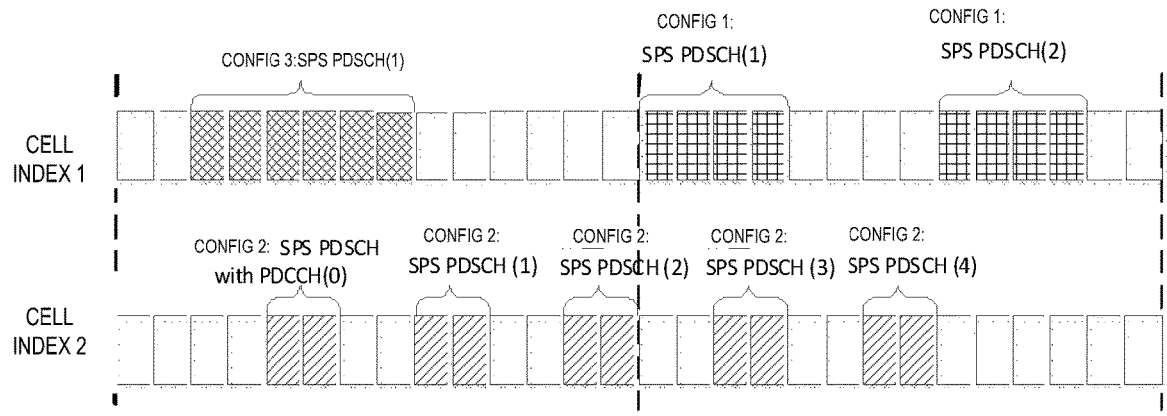
FIG. 3 is a schematic diagram of an embodiment of codebook sorting under the condition that first-type PDCCHs are included.

In order to make the objectives, technical solutions and advantages of the present application clearer, the technical solutions of the present application will be described clearly and completely in conjunction with the detailed embodiments and corresponding drawings of the present application. Obviously, the described embodiments are only a part of the embodiments of the present application, but not all the embodiments. Based on the embodiments in the present application, all other embodiments obtained by those of ordinary skill in the art without inventive efforts fall within the protection scope of the present application.

The technical solutions provided by the embodiments of the present application will be described in detail below in conjunction with the drawings.

FIG. 1 is a flowchart of an embodiment of a method according to the present invention.

Provided in the embodiments of the present application is a hybrid automatic repeat request feedback method, comprising at least one of the following steps 101-103.

Step 101, an HARQ-ACK codebook includes HARQ-ACK information of M PDSCHs, wherein the M PDSCHs are all scheduled by first-type PDCCHs, and the first-type PDCCHs are used for activating SPS configurations;

at least two of the M PDSCHs belong to the same SPS configuration, and/or at least two of the M PDSCHs belong to different SPS configurations; and the order of the HARQ-ACK information of the M PDSCHs in the HARQ-ACK codebook is arranged according to at least one parameter value among cell indexes, BWP indexes, SPS configuration indexes and PDSCH transmission moments of the M PDSCHs.

Step 102, in step 101 mentioned above, further, the HARQ-ACK codebook further includes HARQ-ACK information of N second-type PDCCHs, wherein the second-type PDCCH is used for releasing the SPS configuration, N≥1;

the second-type PDCCH comprises a reference field, wherein the reference field is used for indicating the transmission moment of a virtual PDSCH corresponding to the released SPS configuration;

the order of the HARQ-ACK information of the M PDSCHs and the HARQ-ACK information of the N second-type PDCCHs in the HARQ-ACK codebook is arranged according to at least one parameter value among cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released by the N second-type PDCCHs.

Preferably, the position of the reference field in the second-type PDCCH is the same as the position of a time domain resource assignment field in the first-type PDCCH, wherein the time domain resource assignment field is used in the first-type PDCCH to indicate the PDSCH transmission moment for activating SPS. M can also be equal to zero, that is, the HARQ-ACK information of the N second-type PDCCHs forms the HARQ-ACK codebook. The HARQ-ACK codebook is determined in the manner of step 102.

Step 103, further, in either of steps 101 and 102 mentioned above, the HARQ-ACK codebook further includes HARQ-ACK information of each of the P PDSCHs scheduled by third-type PDCCHs, wherein the third-type PDCCHs are used for dynamically scheduling the PDSCHs;

the order of the HARQ-ACK information of the M PDSCHs, the HARQ-ACK information of the N second-type PDCCHs and the HARQ-ACK information of the P PDSCHs scheduled by the third-type PDCCHs in the HARQ-ACK codebook is arranged according to at least one parameter value among the levels of the M PDSCHs, the N second-type PDCCHs and the P PDSCHs, cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released by the N second-type PDCCHs; among the M PDSCHs, the first PDSCH transmitted after the PDCCHs activate the SPS configuration is of a first level, and the second and subsequent PDSCHs transmitted after the PDCCHs activate the SPS configuration are of a second level; the level of the N second-type PDCCHs is the first level, and the level of the P PDSCHs is the first level.

FIG. 2 is a schematic diagram of an embodiment of codebook sorting under the condition that first-type PDCCHs are included.

According to sorting rule (1), the sequence of the HARQ-ACK information of the M PDSCHs in the HARQ-ACK codebook is firstly arranged according to the cell indexes respectively corresponding to the PDSCHs; if the cell index values are the same, the sequence is further arranged according to the BWP indexes respectively corresponding to the PDSCHs; and if the BWP indexes are the same, the sequence is further arranged according to the SPS configuration indexes respectively corresponding to the PDSCHs; and if the SPS configuration indexes are the same, the sequence is further arranged according to the respective transmission moments of the PDSCHs.

For example, if a target HARQ-ACK codebook includes first information, the first information includes HARQ-ACK information of at least two PDSCHs of the same SPS configuration and/or HARQ-ACK information of a PDSCH group corresponding to the at least two SPS configurations. In this case, the sequential order of the HARQ-ACK information in the first information sequentially satisfies the condition that the cell index numbers of the corresponding PDSCHs are arranged in ascending order, the BWP index numbers of the PDSCHs are arranged in ascending order, the index numbers of the SPS configurations are arranged in ascending order, and the transmission moments of the PDSCHs are arranged in chronological order.

Specifically, if the target codebook includes HARQ-ACK information of PDSCHs of the SPS configuration of a first cell and HARQ-ACK information of PDSCHs of the SPS configuration of a second cell, and the cell index number of the first cell is less than the cell index number of the second cell, the position of the HARQ-ACK information corresponding to all the PDSCHs of the first cell in the target codebook is located before the position of the HARQ-ACK information corresponding to the PDSCHs of the second cell in the target codebook. If the target codebook includes HARQ-ACK information of PDSCHs of the SPS configuration of B-1 of the first cell and HARQ-ACK information of PDSCHs of the SPS configuration of B-2 of the second cell, and the index number of the bandwidth part of B-1 is less than the index number of the bandwidth part of B-2, the position of the HARQ-ACK information corresponding to all the PDSCHs of B-1 in the target codebook is located before the position of the HARQ-ACK information corresponding to the PDSCHs of B-2 in the target codebook. If the target codebook includes HARQ-ACK information corresponding to PDSCHs of X SPS configurations of a target bandwidth part of a target cell, and if the configuration index number of a first SPS configuration is less than the configuration index number of a second SPS configuration, the position of the HARQ-ACK information corresponding to all the PDSCHs of the first SPS configuration in the target codebook is located before the position of the HARQ-ACK information corresponding to the corresponding PDSCHs of the second SPS configuration in the target codebook. If the target codebook includes the HARQ-ACK information corresponding to the Y PDSCHs in the Kth SPS configuration of the target bandwidth part of the target cell, the HARQ-ACK codebook information corresponding to the Y PDSCHs is in the same as the Y PDSCH transmission moments in chronological order. The PDSCH transmission moments mentioned here are based on the start time of the PDSCHs or the end time of the PDSCHs.

In the present embodiment, regardless of whether the HARQ-ACK information in the first information is the initial HARQ-ACK information or the HARQ-ACK information of other PDSCHs after the SPS configuration is activated, the above-mentioned sorting rule of the HARQ-ACK information in the target HARQ-ACK codebook is followed. The initial HARQ-ACK information mentioned here corresponds to the first PDSCH of the SPS configuration activated by PDCCHs scrambled with a first Radio Network Tempory Identity.

The HARQ-ACK information of SPS PDSCH as shown in the example of FIG. 2 constitutes the first information in the target HARQ-ACK codebook, including: SPS PDSCH (1) of configuration 3 in a cell having the cell index number of 1; SPS PDSCH(1), SPS PDSCH(2) of configuration 1 in the cell having the cell index number of 1; SPS PDSCH(0), SPS PDSCH(1), SPS PDSCH(2), SPS PDSCH(3), SPS PDSCH(4) of configuration 2 in a cell having the cell index number of 2, wherein PDSCH(0) is the first PDSCH after configuration 3 is activated. Configuration 1, configuration 2, and configuration 3 respectively represent three SPS configurations with SPS configuration indexes in ascending order.

Then, the order of the first information in the target HARQ-ACK codebook is $O_0^{-ACK} O_1^{-ACK} O_2^{-ACK} O_3^{-ACK} O_4^{-ACK} O_5^{-ACK} O_6^{-ACK} O_7^{-ACK}$. $O_0^{-ACK}$ to $O_7^{-ACK}$ sequentially respectively correspond to HARQ-ACK information of SPS PDSCH(1) of configuration 1, HARQ-ACK information of SPS PDSCH(2) of configuration 1, HARQ-ACK information of SPS PDSCH (1) of configuration 3, HARQ-ACK information of SPS PDSCH(0) of configuration 2, HARQ-ACK information of SPS PDSCH(1) of configuration 2, HARQ-ACK information of SPS PDSCH(2) of configuration 2, HARQ-ACK information of SPS PDSCH(3) of configuration 2 and HARQ-ACK information of SPS PDSCH(4) of configuration 2.

It should be noted that FIG. 2 shows an example of sorting parameter values in ascending order and chronological order. The parameter values comprise: a cell index number, a BWP index number, an SPS configuration index number and a PDSCH transmission moment. Those skilled in the art can also sort the parameter values in descending order and reverse chronological order, or sort some parameter values in ascending order and some other parameter values in descending order, all of which fall within the protection scope of the technical solutions of the present application.

FIG. 3 is a schematic diagram of another embodiment of codebook sorting under the condition of first-type PDCCHs.

According to sorting rule (2), the order of the HARQ-ACK information of the M PDSCHs in the HARQ-ACK codebook is that: the HARQ-ACK information is firstly arranged according to the cell indexes respectively corresponding to the PDSCHs; if the cell index values are the same, the HARQ-ACK information is then arranged according to the BWP indexes respectively corresponding to the PDSCHs; and if the BWP indexes are the same, the HARQ- ACK information is then arranged according to the respective transmission moments of the PDSCHs.

For example, if a target HARQ-ACK codebook includes first information, the first information includes HARQ-ACK information of at least two PDSCHs of the same SPS configuration and/or HARQ-ACK information of a PDSCH group corresponding to at least two SPS configurations. In this case, the sequential order of the HARQ-ACK information in the first information sequentially satisfies the condition that the cell index numbers of the corresponding PDSCHs are arranged in ascending order, the BWP index numbers of the PDSCHs are arranged in ascending order, and the transmission moments of the PDSCHs are arranged in chronological order.

If the target codebook includes HARQ-ACK information of PDSCHs of the SPS configuration of a first cell and HARQ-ACK information of PDSCHs of the SPS configuration of a second cell, and the cell index number of the first cell is less than the cell index number of the second cell, the position of the HARQ-ACK information corresponding to all the PDSCHs of the first cell in the target codebook is located before the position of the HARQ-ACK information corresponding to the PDSCHs of the second cell in the target codebook. If the target codebook includes HARQ-ACK information of PDSCHs of the SPS configuration of B-1 of the first cell and HARQ-ACK information of PDSCHs of the SPS configuration of B-2 of the second cell, and the index number of the bandwidth part of B-1 is less than the index number of the bandwidth part of B-2, the position of the HARQ-ACK information corresponding to all the PDSCHs of B-1 in the target codebook is located before the position of the HARQ-ACK information corresponding to the PDSCHs of B-2 in the target codebook. If the target codebook includes HARQ-ACK information corresponding to J PDSCHs of the target bandwidth part of the target cell, the HARQ-ACK codebook information corresponding to the J PDSCHs is in the same as the J PDSCH transmission moments in chronological order. The PDSCH transmission moments mentioned here are based on the start time of the PDSCHs or the end time of the PDSCHs.

In the present embodiment, regardless of whether the HARQ-ACK information in the first information is the initial HARQ-ACK information or the HARQ-ACK information of other PDSCHs after the SPS configuration is activated, the above-mentioned sorting rule of the HARQ-ACK information in the target HARQ-ACK codebook is followed. The initial HARQ-ACK information mentioned here corresponds to the first PDSCH of the SPS configuration activated by PDCCHs scrambled with a first Radio Network Tempory Identity.

The HARQ-ACK information of SPS PDSCH as shown in the example of FIG. 3 constitutes the first information in the target HARQ-ACK codebook, including: SPS PDSCH(1) of configuration 3 in a cell having the cell index number of 1; SPS PDSCH(1), SPS PDSCH(2) of configuration 1 in the cell having the cell index number of 1; SPS PDSCH(0), SPS PDSCH(1), SPS PDSCH(2), SPS PDSCH(3), SPS PDSCH(4) of configuration 2 in a cell having the cell index number of 2, wherein PDSCH(0) is the first PDSCH after configuration 3 is activated. Configuration 1, configuration 2 and configuration 3 respectively represent three SPS configurations with SPS configuration indexes in ascending order.

Then, the order of the first information in the target HARQ-ACK codebook is $O_0^{-ACK} O_1^{-ACK} O_2^{-ACK} O_3^{-ACK} O_4^{-ACK} O_5^{-ACK} O_6^{-ACK} O_7^{-ACK}$. $O_0^{-ACK}$ to $O_7^{-ACK}$ sequentially respectively correspond to HARQ-ACK information of SPS PDSCH(1) of configuration 3, HARQ-ACK information of SPS PDSCH(1) of configuration 1, HARQ-ACK information of SPS PDSCH (2) of configuration 1, HARQ-ACK information of SPS PDSCH(0) of configuration 2, HARQ-ACK information of SPS PDSCH(1) of configuration 2, HARQ-ACK information of SPS PDSCH(2) of configuration 2, HARQ-ACK information of SPS PDSCH(3) of configuration 2 and HARQ-ACK information of SPS PDSCH(4) of configuration 2.

It should be noted that FIG. 3 shows an example of sorting parameter values in ascending order and chronological order. The parameter values comprise: a cell index number, a BWP index number and a PDSCH transmission moment. Those skilled in the art can also sort the parameter values in descending order and reverse chronological order, or sort some parameter values in ascending order and some other parameter values in descending order, all of which fall within the protection scope of the technical solutions of the present application.

Figure 4:
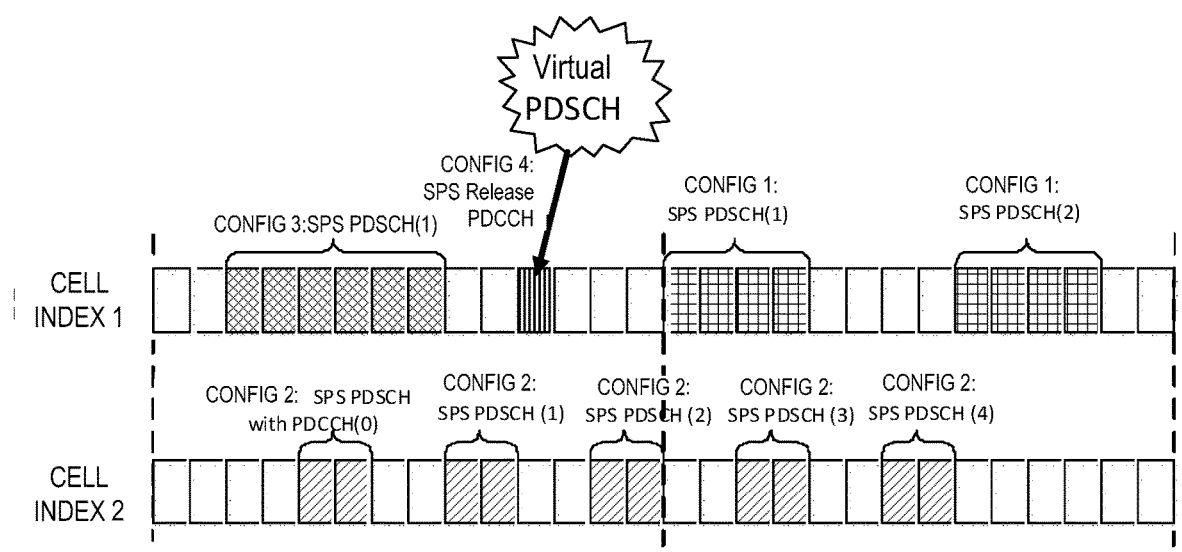
FIG. 4 is a schematic diagram of an embodiment of codebook sorting under the condition that second-type PDCCHs are included.

FIG. 4 is a schematic diagram of an embodiment of codebook sorting under the condition that second-type PDCCHs are included.

According to sorting rule (3), the order of the HARQ-ACK information of the M PDSCHs scheduled by SPS and the HARQ-ACK information of the N second-type PDCCHs in the HARQ-ACK codebook is that: the HARQ-ACK information is firstly arranged according to the cell indexes; if the cell index values are the same, the HARQ-ACK information is then arranged according to the BWP indexes; and if the BWP indexes are the same, the HARQ-ACK information is then arranged according to the SPS configuration indexes; and if the SPS configuration indexes are the same, the HARQ-ACK information is then arranged according to the PDSCH transmission moments or the virtual PDSCH transmission moments.

Alternatively, the order of the HARQ-ACK information of the M PDSCHs scheduled by SPS and the HARQ-ACK information of the N second-type PDCCHs in the HARQ-ACK codebook is that: the HARQ-ACK information is firstly arranged according to the cell indexes; if the cell index values are the same, the HARQ-ACK information is then arranged according to the BWP indexes; and if the BWP indexes are the same, the HARQ-ACK information is then arranged according to the PDSCH transmission moments or the virtual PDSCH transmission moments.

For example, if the target HARQ-ACK codebook includes second information, the second information is HARQ-ACK information corresponding to second-type PDCCHs, and the position of the second information in the target HARQ-ACK codebook is determined by a cell index, a BWP index, an SPS configuration index and a virtual PDSCH transmission moment corresponding to the SPS configuration released by the second-type PDCCH. The second-type PDCCH comprises a reference field, wherein the reference field is used for indicating the transmission moment of a virtual PDSCH corresponding to the released SPS configuration.

If a terminal device receives an indication that a base station releases the SPS configuration by means of the PDCCH, the terminal device stops receiving or sending data on the resource corresponding to the SPS configuration. The PDCCH that releases a downlink SPS configuration uses DCI format 0_0 or DCI format 1_0. The base station releases the SPS configuration by means of the PDCCH that is scrambled with CS-RNTI. In addition, information carried in an identification field in the PDCCH that releases the SPS configuration is preset information, as shown in table 1, and identification information includes an HARQ-ACKARQ process number, a redundancy version, a modulation and coding scheme, and frequency domain resource assignment.

TABLE 1

| Field | DCI format 0_0 | DCI format 1_0 |
|---|---|---|
| HARQ process number | set to all '0' | set to all '0' |
| Redundancy version | set to '00' | set to '00' |
| Modulation and coding scheme | set to all '1' | set to all '1' |
| Frequency domain resource assignment | set to all '1' | set to all '1' |

If the target HARQ-ACK codebook includes HARQ-ACK information corresponding to a PDCCH that releases an SPS configuration set, the position of the HARQ-ACK information corresponding to the PDCCH in the target codebook is determined by the reference field in the PDCCH. Except for the identification field in the PDCCH mentioned above, the other fields in the PDCCH can all be used to determine the position of the HARQ-ACK information corresponding to the PDCCH in the target codebook. Preferably, a time domain resource assignment field in the PDCCH is used as a reference field.

For example, if the terminal device detects a PDCCH scrambled with the CS-RNTI, and determines that the identification field in the PDCCH carries preset information, it is determined that the PDCCH is used for releasing the SPS configuration. Thus, the information carried in the reference field has no practical meaning. The base station can use the information carried in the reference field to indicate the position of the HARQ-ACK information corresponding to the PDCCH in the target codebook.

For example, in addition to the second information, the target codebook also includes first information. The first information includes HARQ-ACK information of at least two PDSCHs of the same SPS configuration and/or HARQ-ACK information of a PDSCH group corresponding to at least two SPS configurations. The sequential order of the HARQ-ACK information in the first information and the second information sequentially satisfies the condition that the cell index numbers of the corresponding PDSCHs are arranged in ascending order, the BWP index numbers of the PDSCHs are arranged in ascending order, the index numbers of the SPS configurations are arranged in ascending order, and the transmission moments of the PDSCHs are arranged in chronological order. The PDSCH transmission moment corresponding to the second information is determined by a virtual PDSCH transmission moment. Although the virtual PDSCH is not actually transmitted by the base station, the indication of the reference field can be used as a "virtual PDSCH" to determine the position of the HARQ-ACK corresponding to the PDCCH in the target codebook. As shown in the example of FIG. 4, the first information and the second information constitute a target codebook. The second information is the HARQ-ACK information of the PDCCH used for releasing the SPS of configuration 4, and the HARQ-ACK information of the SPS PDSCH constitutes the first information in the target HARQ-ACK codebook, including: SPS PDSCH(1) of configuration 1 in a cell having the cell index number of 1; SPS PDSCH(1), SPS PDSCH(2) of configuration 2 in the cell having the cell index number of 1; SPS PDSCH(0), SPS PDSCH(1), SPS PDSCH(2), SPS PDSCH(3), SPS PDSCH(4) of configuration 3 in a cell having the cell index number of 2, wherein PDSCH(0) is the first PDSCH after configuration 3 is activated. Configuration 1, configuration 2, and configuration 3 respectively represent three SPS configurations with SPS configuration indexes in ascending order.

Then, the order of each HARQ-ACK in the first information and the second information in the target HARQ-ACK codebook is $O_0^{-ACK} O_1^{-ACK} O_2^{-ACK} O_3^{-ACK} O_4^{-ACK} O_5^{-ACK} O_6^{-ACK} O_7^{-ACK} O_8^{-ACK}$. $O_0^{-ACK}$ to $O_8^{-ACK}$ sequentially respectively correspond to HARQ-ACK information of SPS PDSCH(1) of configuration 1, HARQ-ACK information of SPS PDSCH(2) of configuration 1, HARQ-ACK information of SPS PDSCH(1) of configuration 3, HARQ-ACK information of SPS PDCCH that releases configuration 4, HARQ-ACK information of SPS PDSCH(0) of configuration 2, HARQ-ACK information of SPS PDSCH(1) of configuration 3, HARQ-ACK information of SPS PDSCH(2) of configuration 3, HARQ-ACK information of SPS PDSCH(3) of configuration 3 and HARQ-ACK information of SPS PDSCH(4) of configuration 3.

Alternatively, the order of each HARQ-ACK in the first information and the second information in the target HARQ-ACK codebook is $O_0^{-ACK} O_1^{-ACK} O_2^{-ACK} O_3^{-ACK} O_4^{-ACK} O_5^{-ACK} O_6^{-ACK} O_7^{-ACK} O_8^{-ACK}$. $O_0^{-ACK}$ to $O_8^{-ACK}$ sequentially respectively correspond to HARQ-ACK information of SPS PDSCH(1) of configuration 3, HARQ-ACK information of SPS PDCCH that releases configuration 4, HARQ-ACK information of SPS PDSCH(1) of configuration 1, HARQ-ACK information of SPS PDSCH(2) of configuration 1, HARQ-ACK information of SPS PDSCH(0) of configuration 2, HARQ-ACK information of SPS PDSCH(1) of configuration 3, HARQ-ACK information of SPS PDSCH(2) of configuration 3, HARQ-ACK information of SPS PDSCH(3) of configuration 3 and HARQ-ACK information of SPS PDSCH(4) of configuration 3.

Further, an embodiment of the HARQ-ACK codebook including HARQ-ACK of PDSCHs scheduled by third-type PDCCHs is as follows:

According to sorting rule (4), the order of the HARQ-ACK information of the M PDSCHs scheduled by SPS, the HARQ-ACK information of the N second-type PDCCHs and the HARQ-ACK information of the P PDSCHs scheduled by the third-type PDCCHs in the HARQ-ACK codebook is that: the HARQ-ACK information is firstly arranged according to the levels corresponding to the PDSCHs: first comes the HARQ-ACK information of a first-level PDSCH or PDCCH, followed by the HARQ-ACK information of a second-level PDSCH; if there is more than one first-level PDSCH or PDCCH, the order of respective HARQ-ACK information of a first-level channel in the HARQ-ACK codebook is determined according to a downlink assignment index (DAI) in each of the PDCCHs corresponding to the first-level channel; and if there is more than one second-level PDSCH, the order of HARQ-ACK information of second-level PDSCHs in the HARQ-ACK codebook is determined according to at least one parameter value among cell indexes, BWP indexes, SPS configuration indexes and PDSCH transmission moments of the second-level PDSCHs.

For example, if the target HARQ-ACK codebook includes the HARQ-ACK information of the M PDSCHs, the HARQ-ACK information of the N second-type PDCCHs and the HARQ-ACK information of the P PDSCHs scheduled by the third-type PDCCHs, the first-type PDCCHs are used for activating an SPS configuration, and are scrambled with a first Radio Network Tempory Identity, and the third-type PDCCHs are used for dynamically scheduling PDSCHs, and are scrambled with a second Radio Network Tempory Identity. If the HARQ-ACK codebook is a semi-static codebook, the HARQ-ACK information in the target codebook is sorted according to the sequential order of candidate PDSCH sets of each cell. If there are P PDSCHs related to the first information, and Q out of the P PDSCHs does not belong to $M_c$ candidate PDSCH sets determined in the manner described in Section 9.1.2 of 3GPP 38.213 Vf 6.0, the target codebook is formed by sequentially cascading fourth information and fifth information. The fourth information is HARQ-ACK information corresponding to the $M_c$ candidate PDSCH sets in the target codebook determined in the manner described in Section 9.1.2 of 3GPP 38.213 Vf 6.0. The fifth information is formed by sequentially cascading HARQ-ACK of the Q PDSCHs not belonging to the $M_c$ candidate PDSCH sets, and the specific order satisfies the sorting rule (1) or (2).

With regard to PDSCHs, the HARQ-ACK information in the target HARQ-ACK codebook has M PDSCHs scheduled by the first-type PDCCHs and P PDSCHs scheduled by the third-type PDCCHs; with regard to PDCCHs, the HARQ-ACK information in the target HARQ-ACK codebook is HARQ-ACK information of N second-type PDCCHs. These PDSCHs and PDCCHs are divided into two levels. Among the M PDSCHs: the first PDSCH transmitted after the PDCCHs activate the SPS configuration is of a first level, and the second and subsequent PDSCHs transmitted after the PDCCHs activate the SPS configuration are of a second level; and the level of the N second-type PDCCHs is the first level; and the level of the P PDSCHs is the first level.

If the HARQ-ACK codebook is a dynamic codebook, the order of the HARQ-ACK information in the dynamic codebook is: first, the HARQ-ACK information in the order determined according to the respective DAIs of PDCCHs used for scheduling ordinary PDSCHs and scrambled with the second Radio Network Tempory Identity, PDCCHs used for activating the SPS configuration and scrambled with the first Radio Network Tempory Identity, and PDCCHs used for SPS PDSCH releasing, and then the HARQ-ACK information of SPS PDSCHs without corresponding PDCCH scheduling. The order of information of PDSCHs without corresponding PDCCH scheduling satisfies sorting rule (1). The manner in which the order of the HARQ-ACK information is determined according to DAIs is as described in Section 9.1.3 of 3GPP 38.213 Vf.6.0.

Figure 5:
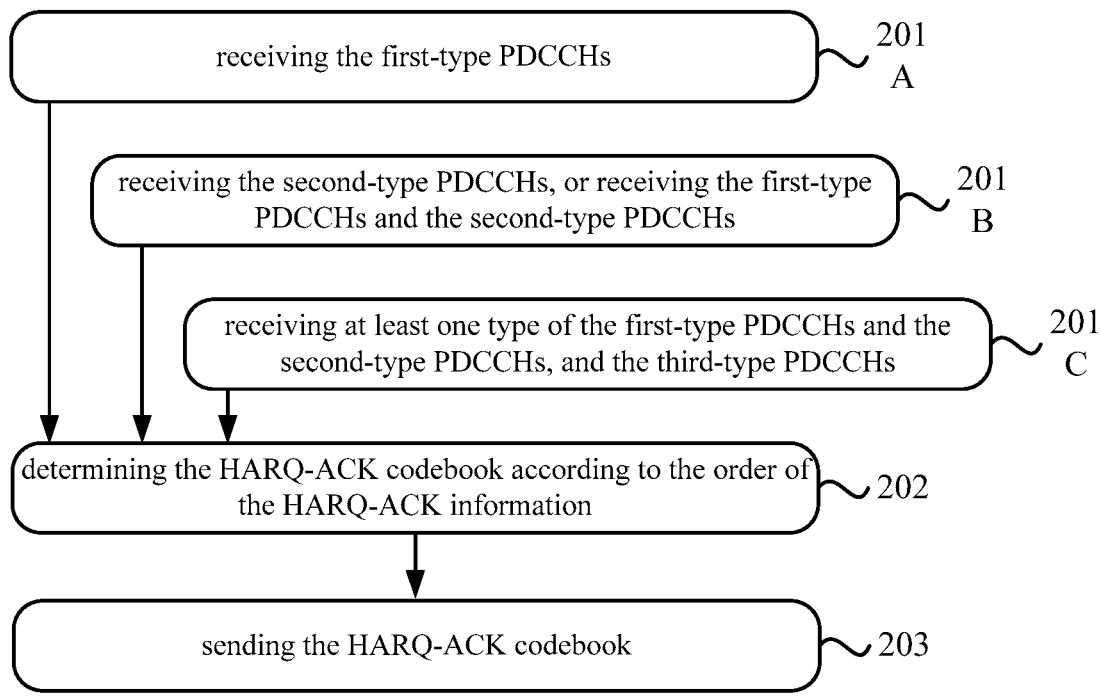
FIG. 5 is a flowchart of an embodiment of a method applied to a terminal device according to the present invention.

FIG. 5 is a flowchart of an embodiment of a method applied to a terminal device according to the present invention.

The method according to any one of the embodiments in the first aspect of the present application is applied to a terminal device, and comprises at least one of the following steps 201A-C, and steps 202-203:

Step 201A, receiving the first-type PDCCHs.

In the present embodiment, the terminal device acquires PDCCHs for activating semi-persistent scheduling configurations. The terminal device obtains activation information of N SPS configurations, N≥1.

The first-type PDCCHs have been defined in step 101 of the embodiment, and details will not be repeated here again.

Further, the method further comprises the following step:

Step 201B, receiving the second-type PDCCHs, or receiving the first-type PDCCHs and the second-type PDCCHs.

The second-type PDCCHs have been defined in step 102 of the embodiment, and details will not be repeated here again.

Further, the method further comprises the following steps.

Step 201C, receiving at least one type of the first-type PDCCHs and the second-type PDCCHs, and the third-type PDCCHs.

The third-type PDCCHs have been defined in step 103 of the embodiment, and details will not be repeated here again.

Step 202, determining the HARQ-ACK codebook according to the order of the HARQ-ACK information.

The order of the HARQ-ACK information has been defined in steps 101 to 103 of the embodiment, and for details, please refer to sorting rules (1)-(4).

Step 203, sending the HARQ-ACK codebook.

The terminal device determines and sends, at a target time, a target HARQ-ACK codebook, wherein the target HARQ-ACK codebook includes first information, and the first information comprises at least one of the following: HARQ-ACK information of at least two PDSCHs of the same SPS configuration, and HARQ-ACK information of a PDSCH group corresponding to at least two SPS configurations.

Figure 6:
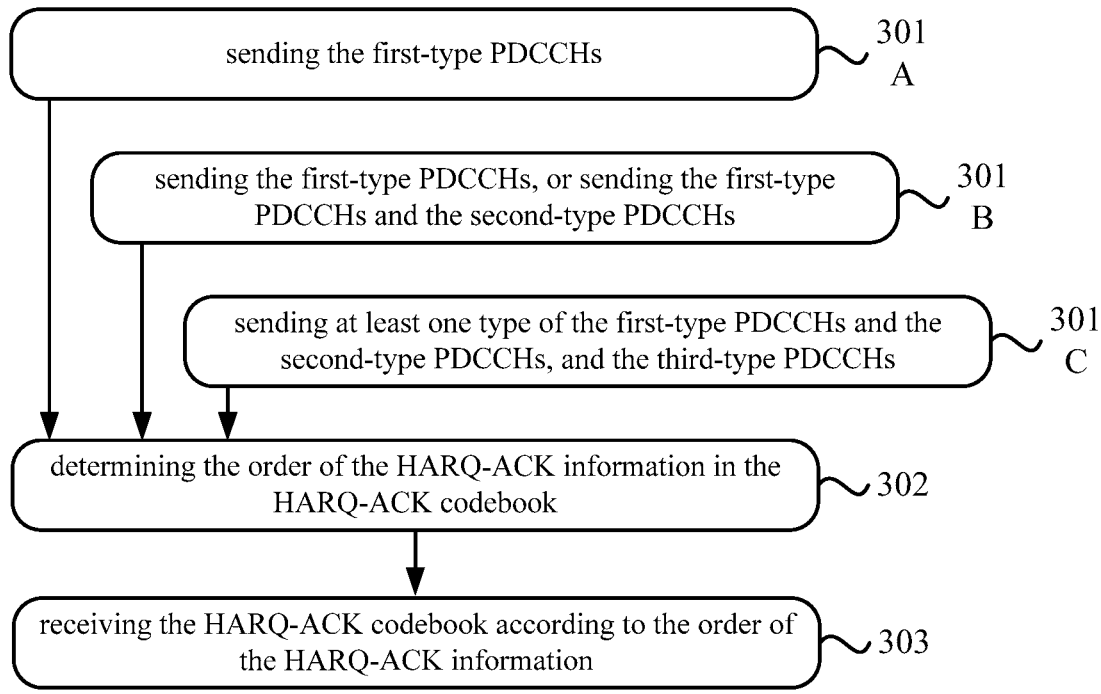
FIG. 6 is a flowchart of an embodiment of a method applied to a network device according to the present invention.

FIG. 6 is a flowchart of an embodiment of a method applied to a network device according to the present invention.

The method according to any one of the embodiments in the first aspect of the present application is applied to a network device, and comprises at least one of the following steps 301A-C, and steps 302-303.

Step 301A, sending the first-type PDCCHs.

A base station configures an SPS resource for a terminal device by means of RRC signaling. After receiving the SPS configuration, the terminal device activates the SPS configuration by means of a PDCCH, and then receives data on the corresponding resource according to an SPS period.

The parameters included in the SPS configuration comprise a configuration index number, a period T, the number of HARQ processes, a PUCCH resource, an MCS table used, etc. Optionally, the PDCCH is scrambled with CS-RNTI.

The first-type PDCCHs have been defined in step 101 of the embodiment, and details will not be repeated here again.

Further, the method further comprises the following step:

Step 301B, sending the first-type PDCCHs, or sending the first-type PDCCHs and the second-type PDCCHs.

The second-type PDCCHs have been defined in step 102 of the embodiment, and details will not be repeated here again.

Further, the method further comprises the following step:

Step 301C, sending at least one type of the first-type PDCCHs and the second-type PDCCHs, and the third-type PDCCHs.

The third-type PDCCHs have been defined in step 103 of the embodiment, and details will not be repeated here again.

Step 302, determining the order of the HARQ-ACK information in the HARQ-ACK codebook.

The order of the HARQ-ACK information has been defined in steps 101-103 of the embodiment, and for details, please refer to sorting rules (1)-(4).

Step 303, receiving the HARQ-ACK codebook according to the order of the HARQ-ACK information.

Figure 7:
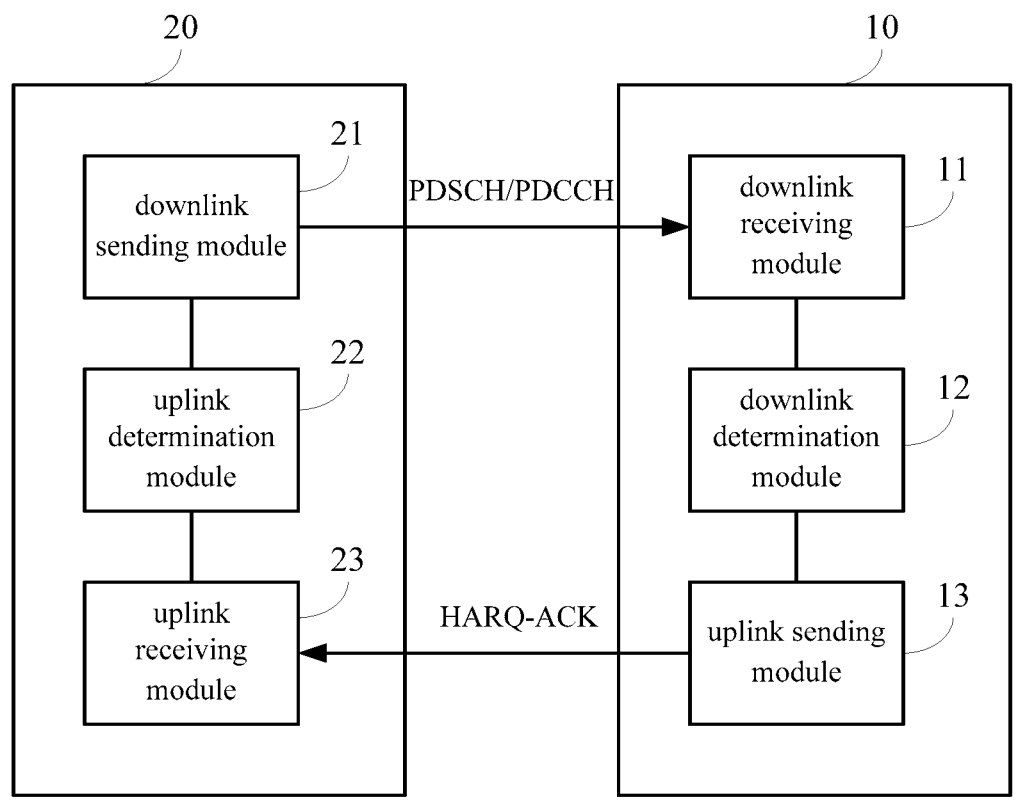
FIG. 7 is a schematic diagram of an embodiment of a terminal device and a network device according to the present invention.

FIG. 7 is a schematic diagram of an embodiment of a terminal device and a network device according to the present invention.

In a second aspect, further provided in the embodiments of the present application is a terminal device 10, which is used for scheduling of multi-SPS configurations, and comprises: a downlink receiving module 11, a downlink determination module 12 and an uplink sending module 13.

The downlink receiving module is used for receiving first-type PDCCHs, wherein the first-type PDCCHs are used for activating the SPS configurations; M PDSCHs are all scheduled by the first-type PDCCHs; and at least two of the M PDSCHs belong to the same SPS configuration, and/or at least two of the M PDSCHs belong to different SPS configurations; and The uplink sending module is used for sending an HARQ-ACK codebook at a target time, wherein the HARQ-ACK codebook includes HARQ-ACK information of the M PDSCHs.

The downlink determination module is used for determining the order of the HARQ-ACK information of the M PDSCHs in the HARQ-ACK codebook, wherein the order is arranged according to at least one parameter value among cell indexes, BWP indexes, SPS configuration indexes and PDSCH transmission moments of the M PDSCHs.

Further, the downlink receiving module is further used for receiving second-type PDCCHs, wherein the second-type PDCCHs are used for releasing the SPS configurations, $N \geq 1$. The second-type PDCCH comprises a reference field, wherein the reference field is used for indicating the transmission moment of a virtual PDSCH corresponding to the released SPS configuration. The HARQ-ACK codebook includes HARQ-ACK information of N second-type PDCCHs.

The downlink determination module is further used for determining the order of the HARQ-ACK information of the M PDSCHs and the HARQ-ACK information of the N second-type PDCCHs in the HARQ-ACK codebook, wherein the order is arranged according to at least one parameter value among cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released by the N second-type PDCCHs.

Preferably, the position of the reference field in the second-type PDCCHs is the same as the position of a time domain resource assignment field in the first-type PDCCHs, wherein the time domain resource assignment field is used in the first-type PDCCHs to indicate the PDSCH transmission moment for activating SPS.

Further, the downlink receiving module is further used for receiving third-type PDCCHs; the third-type PDCCHs are used for dynamically scheduling PDSCHs; and the HARQ-ACK codebook includes HARQ-ACK information of each of the P PDSCHs scheduled by third-type PDCCHs.

The downlink determination module is further used for determining the order of the HARQ-ACK information of the M PDSCHs, the HARQ-ACK information of the N second-type PDCCHs and the HARQ-ACK information of the P PDSCHs scheduled by the third-type PDCCHs in the HARQ-ACK codebook, wherein the order is arranged according to at least one parameter value among the levels of the M PDSCHs, the N second-type PDCCHs and the P PDSCHs, cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released by the N second-type PDCCHs; among the M PDSCHs, the first PDSCH transmitted after the PDCCHs activate the SPS configuration is of a first level, and the second and subsequent PDSCHs transmitted after the PDCCHs activate the SPS configuration are of a second level; the level of the N second-type PDCCHs is the first level, and the level of the P PDSCHs is the first level.

In a third aspect, further provided in the embodiments of the present application is a network device 20, which is used for scheduling of multi-SPS configurations, and comprises a downlink sending module 21, an uplink determination module 22 and an uplink receiving module 23.

The downlink sending module is used for sending first-type PDCCHs, wherein the first-type PDCCHs are used for activating the SPS configurations; M PDSCHs are all scheduled by the first-type PDCCH; and at least two of the M PDSCHs belong to the same SPS configuration, and/or at least two of the M PDSCHs belong to different SPS configurations; and the uplink receiving module is used for receiving an HARQ-ACK codebook, wherein the HARQ-ACK codebook includes HARQ-ACK information of the M PDSCHs.

The uplink determination module is used for determining the order of the HARQ-ACK information of the M PDSCHs in the HARQ-ACK codebook, wherein the order is arranged according to at least one parameter value among cell indexes, BWP indexes, SPS configuration indexes and PDSCH transmission moments of the M PDSCHs.

Further, the downlink sending module is further used for sending second-type PDCCHs, wherein the second-type PDCCHs are used for releasing the SPS configurations, $N \geq 1$. The second-type PDCCH comprises a reference field, wherein the reference field is used for indicating the transmission moment of a virtual PDSCH corresponding to the released SPS configuration. The HARQ-ACK codebook includes HARQ-ACK information of N second-type PDCCHs.

The uplink determination module is further used for determining the order of the HARQ-ACK information of the M PDSCHs and the HARQ-ACK information of the N second-type PDCCHs in the HARQ-ACK codebook, wherein the order is arranged according to at least one parameter value among cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released by the N second-type PDCCHs.

Preferably, the position of the reference field in the second-type PDCCHs is the same as the position of a time domain resource assignment field in the first-type PDCCHs, wherein the time domain resource assignment field is used in the first-type PDCCHs to indicate the PDSCH transmission moment for activating SPS.

Further, the downlink sending module is further used for sending third-type PDCCHs; the third-type PDCCHs are used for dynamically scheduling PDSCHs; the HARQ-ACK codebook includes HARQ-ACK information of each of the P PDSCHs scheduled by third-type PDCCHs.

The uplink determination module is further used for determining the order of the HARQ-ACK information of the M PDSCHs, the HARQ-ACK information of the N second-type PDCCHs and the HARQ-ACK information of the P PDSCHs scheduled by the third-type PDCCHs in the HARQ-ACK codebook, wherein the order is arranged according to at least one parameter value among the level of each of the M PDSCHs, the N second-type PDCCHs and the P PDSCHs, cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released by the N second-type PDCCHs; among the M PDSCHs, the first PDSCH transmitted after the PDCCHs activate the SPS configuration is of a first level, and the second and subsequent PDSCHs transmitted after the PDCCHs activate the SPS configuration are of a second level; the level of the N second-type PDCCHs is the first level, and the level of the P PDSCHs is the first level.

In the method, device and system of the present application, the sorting of the target HARQ-ACK codebook comprises any combination of the following four designs:

I. The target HARQ-ACK codebook includes first information, wherein the first information includes HARQ-ACK information of at least two PDSCHs of the same SPS configuration and/or HARQ-ACK information of a PDSCH group corresponding to at least two SPS configurations. In this case, the order of the HARQ-ACK information in the first information satisfies sorting rule (1).

II. The target HARQ-ACK codebook includes first information, wherein the first information includes HARQ-ACK information of at least two PDSCHs of the same SPS configuration and/or HARQ-ACK information of a PDSCH group corresponding to at least two SPS configurations. In this case, the order of the HARQ-ACK information in the first information satisfies sorting rule (2).

III. The target HARQ-ACK codebook includes second information, wherein the second information is HARQ-ACK information corresponding to a PDCCH for releasing a deactivated SPS configuration set, and the position of the second information in the target HARQ-ACK codebook is determined by a first field in the PDCCH, and the first field can be, for example, a time domain resource assignment field in the PDCCH.

Except for the identification field in the PDCCH mentioned above, the other fields in the PDCCH can all be used to determine the position of the HARQ-ACK information corresponding to the PDCCH in the target codebook. Preferably, the time domain resource assignment field in the PDCCH is used as the first field. In this case, the order of the first information and the second information satisfies sorting rule (3).

IV. In addition to the first information or the second information, the target HARQ-ACK codebook also includes third information, wherein the third information is HARQ-ACK information of a PDSCH scheduled by a PDCCH scrambled with the second radio network temporary identifier, the first information includes at least one of the following: HARQ-ACK information of at least two PDSCHs of the same SPS configuration, HARQ-ACK information of a PDSCH group corresponding to at least two SPS configurations, and the second information is HARQ-ACK information corresponding to PDCCH used for releasing the SPS configuration. In this case, the order satisfies sorting rule (4).

In the system of the present application, a network device sends downlink service data by means of a PDSCH of an SPS configuration; after receiving the service data, a terminal device feeds back, on a physical uplink control channel (PUCCH) or a physical uplink shared channel (U), acknowledgement (ACK) or non-acknowledgement (NACK) information received by the terminal device for the downlink service data, wherein the ACK and NACK information are collectively referred to as hybrid automatic repeat request response information (HARQ-ACK).

In the system of the present application, according to the timing relationship indication between PDSCHs and HARQ-ACK information corresponding thereto, and the timing relationship indication between PDCCHs that release SPS and HARQ-ACK information corresponding thereto, the terminal device can determine which PDSCHs and which PDCCHs that release SPS are related to the information in the HARQ-ACK codebook that needs to be sent at a target time. Unlike an HARQ-ACK codebook at most including HARQ-ACK information corresponding to one PDSCH of an SPS configuration or HARQ-ACK information of a PDCCH that releases SPS in the prior art, if a terminal device supports to be configured with multiple SPS configuration parameters and/or the terminal device supports an SPS configuration with a very short period, it is possible that a target HARQ-ACK codebook includes at least one of HARQ-ACK information of at least two PDSCHs of the same SPS configuration, HARQ-ACK information of a PDSCH group corresponding to at least two SPS configurations, and HARQ-ACK information corresponding to a PDCCH used for releasing the SPS configuration. For this kind of HARQ-ACK codebook, the sorting rule of HARQ-ACK information therein is designed in the present embodiment. The HARQ process in which the terminal device is configured with multiple SPS configurations is completed, and the system transmission efficiency and bit error rate performance are improved.

It should be understood by those skilled in the art that the embodiments of the present invention can provide methods, systems and computer program products. Thus, the present invention can take the form of hardware embodiments alone, software embodiments alone, or embodiments combining the software and hardware aspects. In addition, the present invention can take the form of computer program products implemented on one or more computer usable storage mediums (including but not limited to magnetic disk memories, CD-ROMs, optical memories and the like) containing computer usable program codes therein.

The present invention is described with reference to the flowcharts and/or the block diagrams of the methods, the devices (systems) and the computer program products according to the embodiments of the present invention. It should be understood that each process and/or block in the flowcharts and/or the block diagrams, and a combination of processes and/or blocks in the flowcharts and/or the block diagrams can be implemented by the computer program instructions. These computer program instructions can be provided to a processor of a general-purpose computer, a special purpose computer, an embedded processor, or other programmable data processing device to produce a machine, such that the instructions executed by the processor of a computer or other programmable data processing device generate means for implementing the functions specified in one or more processes in flowcharts and/or one or more blocks in block diagrams.

It should be further noted that the terms "comprise", "include" or any other variations thereof are intended to cover non-exclusive including, so that a process, method, product or device including a series of elements not only includes the elements, but also includes other elements not clearly listed, or further includes elements inherent to the process, method, product or device. In a case without any more limitations, an element defined by "comprising a . . . " does not exclude that the process, method, product or device including the element further has other identical elements.

The above embodiments are only embodiments of the present application and are not intended to limit the present application. For those skilled in the art, the present application is subject to various changes and variations. Any modifications, equivalent alternatives, improvements, etc., which are within the spirit and principle of the present application, should be included in the scope of the claims of the present application.

What is claimed is:

1. A hybrid automatic repeat request feedback method, characterized in that:
   an HARQ-ACK codebook comprises HARQ-ACK information of M PDSCHs, wherein the M PDSCHs are all scheduled by first-type PDCCHs, and the first-type PDCCHs are used for activating SPS configurations;
   at least two of the M PDSCHs belong to the same SPS configuration, and/or at least two of the M PDSCHs belong to different SPS configurations;
   an order of the HARQ-ACK information of the M PDSCHs in the HARQ-ACK codebook is arranged according to at least one parameter value, the parameter value comprises at least one of the following: cell indexes, BWP indexes, SPS configuration indexes, and PDSCH transmission moments of the M PDSCHs;
   the order is firstly arranged according to the cell indexes respectively corresponding to the PDSCHs;
   the order is further arranged according to the BWP indexes respectively corresponding to the PDSCHs under the condition that the cell index values are the same; and either
   (a) the order is further arranged according to the SPS configuration indexes respectively corresponding to the PDSCHs under the condition that the BWP indexes are the same, and the order is further arranged according to the respective transmission moments of the PDSCHs under the condition that the SPS configuration indexes are the same; or
   (b) the order of the HARQ-ACK information of the M PDSCHs in the HARQ-ACK codebook is firstly arranged according to the cell indexes respectively corresponding to the PDSCHs; the order is further arranged according to the BWP indexes respectively corresponding to the PDSCHs under the condition that the cell index values are the same; and the order is further arranged according to the respective transmission moments of the PDSCHs under the condition that the BWP indexes are the same.

2. The method according to claim 1, characterized in that the HARQ-ACK codebook comprises HARQ-ACK information of N second-type PDCCHs, wherein the second-type PDCCHs are used for releasing a SPS configuration, N≥1;
   the second-type PDCCH comprises a reference field, wherein the reference field is used for indicating a transmission moment of a virtual PDSCH corresponding to the released SPS configuration; and
   the order of the HARQ-ACK information of the M PDSCHs and the HARQ-ACK information of the N second-type PDCCHs in the HARQ-ACK codebook is arranged according to at least one parameter value, the parameter value comprises at least one of the following: cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released by the N second-type PDCCHs.

3. The method according to claim 2, characterized in that a position of the reference field in the second-type PDCCH is the same as a position of a time domain resource assignment field in the first-type PDCCH, wherein the time domain resource assignment field is used in the first-type PDCCH to indicate the PDSCH transmission moment for activating SPS.

4. The method according to claim 2, characterized in that the order of the HARQ-ACK information of the M PDSCHs and the HARQ-ACK information of the N second-type PDCCHs in the HARQ-ACK codebook is firstly arranged according to the cell indexes;
   the order is further arranged according to the BWP indexes under the condition that the cell index values are the same;
   the order is further arranged according to the SPS configuration indexes under the condition that the BWP indexes are the same; and
   the order is further arranged according to the PDSCH transmission moments or the virtual PDSCH transmission moments under the condition that the SPS configuration indexes are the same.

5. The method according to claim 2, characterized in that the order of the HARQ-ACK information of the M PDSCHs and the HARQ-ACK information of the N second-type PDCCHs in the HARQ-ACK codebook is firstly arranged according to the cell indexes;
   the order is further arranged according to the BWP indexes under the condition that the cell index values are the same; and
   the order is further arranged according to the PDSCH transmission moments or the virtual PDSCH transmission moments under the condition that the BWP indexes are the same.

6. The method according to claim 2, applied to a terminal device, characterized in that the method comprises:
   receiving the second-type PDCCHs, or receiving the first-type PDCCHs and the second-type PDCCHs;
   determining the HARQ-ACK codebook according to the order of the HARQ-ACK information; and
   sending the HARQ-ACK codebook.

7. The method according to claim 2, applied to a network device, characterized in that the method comprises:
   sending the first-type PDCCHs, or sending the first-type PDCCHs and the second-type PDCCHs; and
   receiving the HARQ-ACK codebook according to the order of the HARQ-ACK information.

8. The method according to claim 1, characterized in that the HARQ-ACK codebook comprises HARQ-ACK information of each of a P PDSCHs scheduled by third-type PDCCHs, wherein the third-type PDCCHs are used for dynamically scheduling the PDSCHs;
   the order of the HARQ-ACK information of the M PDSCHs, the HARQ-ACK information of a N second-type PDCCHs and the HARQ-ACK information of the P PDSCHs scheduled by the third-type PDCCHs in the HARQ-ACK codebook is arranged according to at least one parameter value, the parameter value comprises at least one of the following: a levels of the M PDSCHs, the N second-type PDCCHs and the P PDSCHs, cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released by the N second-type PDCCHs;
   among the M PDSCHs, the first PDSCH transmitted after the PDCCHs activate the SPS configuration is of a first level, and the second and subsequent PDSCHs transmitted after the PDCCHs activate the SPS configuration are of a second level; and the level of the N second-type PDCCHs is the first level, and the level of the P PDSCHs is the first level.

9. The method according to claim 8, characterized in that the order of the HARQ-ACK information of the M PDSCHs, the HARQ-ACK information of the N second-type PDCCHs and the HARQ-ACK information of the P PDSCHs scheduled by the third-type PDCCHs in the HARQ-ACK codebook is firstly arranged according to the levels corresponding to the PDSCHs: first comes the HARQ-ACK information of a first-level PDSCH or PDCCH, followed by the HARQ-ACK information of a second-level PDSCH;

under the condition that there is more than one first-level PDSCH or PDCCH, the order of respective HARQ-ACK information of a first-level channel in the HARQ-ACK codebook is determined according to a downlink assignment index (DAI) in each of the PDCCHs corresponding to the first-level channel; and under the condition that there is more than one second-level PDSCH, the order of HARQ-ACK information of second-level PDSCHs in the HARQ-ACK codebook is determined according to at least one parameter value among cell indexes, BWP indexes, SPS configuration indexes and PDSCH transmission moments of the second-level PDSCHs.

10. The method according to claim 8, applied to a terminal device, characterized in that the method comprises:
receiving at least one type of the first-type PDCCHs and the second-type PDCCHs, and the third-type PDCCHs;
determining the HARQ-ACK codebook according to the order of the HARQ-ACK information; and
sending the HARQ-ACK codebook.

11. The method according to claim 8, applied to a network device, characterized in that the method comprises:
sending at least one type of the first-type PDCCHs and the second-type PDCCHs, and the third-type PDCCHs; and
receiving the HARQ-ACK codebook according to the order of the HARQ-ACK information.

12. The method according to claim 1, applied to a terminal device, characterized in that the method comprises:
receiving the first-type PDCCHs;
determining the HARQ-ACK codebook according to the order of the HARQ-ACK information; and
sending the HARQ-ACK codebook.

13. The method according to claim 1, applied to a network device, characterized in that the method comprises:
sending the first-type PDCCHs; and
receiving the HARQ-ACK codebook according to the order of the HARQ-ACK information.

14. A terminal device, used for scheduling of multi-SPS configurations, characterized in that the terminal device comprises:
a downlink receiving module, used for receiving first-type PDCCHs, wherein the first-type PDCCHs are used for activating SPS configurations; M PDSCHs are all scheduled by the first-type PDCCHs; and at least two of the M PDSCHs belong to the same SPS configuration, and/or at least two of the M PDSCHs belong to different SPS configurations; and
an uplink sending module, used for sending an HARQ-ACK codebook at a target time, wherein the HARQ-ACK codebook comprises HARQ-ACK information of the M PDSCHs, and an order of the HARQ-ACK information of the M PDSCHs in the HARQ-ACK codebook is arranged according to at least one parameter value, the parameter value comprises at least one of the following: cell indexes, BWP indexes, SPS configuration indexes, and PDSCH transmission moments of the M PDSCHs;

wherein:
the order is firstly arranged according to the cell indexes respectively corresponding to the PDSCHs;
the order is further arranged according to the BWP indexes respectively corresponding to the PDSCHs under the condition that the cell index values are the same; and either (a) the order is further arranged according to the SPS configuration indexes respectively corresponding to the PDSCHs under the condition that the BWP indexes are the same, and the order is further arranged according to the respective transmission moments of the PDSCHs under the condition that the SPS configuration indexes are the same; or (b) the order of the HARQ-ACK information of the M PDSCHs in the HARQ-ACK codebook is firstly arranged according to the cell indexes respectively corresponding to the PDSCHs; the order is further arranged according to the BWP indexes respectively corresponding to the PDSCHs under the condition that the cell index values are the same; and the order is further arranged according to the respective transmission moments of the PDSCHs under the condition that the BWP indexes are the same.

15. The device according to claim 14, characterized in that the downlink receiving module is further used for receiving second-type PDCCHs, wherein the second-type PDCCHs are used for releasing a SPS configurations, N≥1;
the second-type PDCCH comprises a reference field, wherein the reference field is used for indicating a transmission moment of a virtual PDSCH corresponding to the released SPS configuration;
the HARQ-ACK codebook comprises HARQ-ACK information of N second-type PDCCHs; and
the order of the HARQ-ACK information of the M PDSCHs and the HARQ-ACK information of the N second-type PDCCHs in the HARQ-ACK codebook is arranged according to at least one parameter value, the parameter value comprises at least one of the following: cell indexes, BWP indexes, SPS configuration indexes and PDSCH transmission moments of the M PDSCHs, and cell indexes, BWP indexes, SPS configuration indexes and virtual PDSCH transmission moments corresponding to the SPS configurations respectively released by the N second-type PDCCHs.

16. A network device, used for scheduling of multi-SPS configurations, characterized in that the network device comprises:
a downlink sending module, used for sending first-type PDCCHs, wherein the first-type PDCCHs are used for activating SPS configurations; M PDSCHs are all scheduled by the first-type PDCCHs; and at least two of the M PDSCHs belong to the same SPS configuration, and/or at least two of the M PDSCHs belong to different SPS configurations; and
an uplink receiving module, used for receiving an HARQ-ACK codebook, wherein the HARQ-ACK codebook comprises HARQ-ACK information of the M PDSCHs, and an order of a HARQ-ACK information of the M PDSCHs in the HARQ-ACK codebook is arranged according to at least one parameter value, the parameter value comprises at least one of the following: cell indexes, BWP indexes, SPS configuration indexes, and PDSCH transmission moments of the M PDSCHs;

wherein:

the order is firstly arranged according to the cell indexes respectively corresponding to the PDSCHs;

the order is further arranged according to the BWP indexes respectively corresponding to the PDSCHs under the condition that the cell index values are the same; and either (a) the order is further arranged according to the SPS configuration indexes respectively corresponding to the PDSCHs under the condition that the BWP indexes are the same; and the order is further arranged according to the respective transmission moments of the PDSCHs under the condition that the SPS configuration indexes are the same; or (b) the order of the HARQ-ACK information of the M PDSCHs in the HARQ-ACK codebook is firstly arranged according to the cell indexes respectively corresponding to the PDSCHs; the order is further arranged according to the BWP indexes respectively corresponding to the PDSCHs under the condition that the cell index values are the same; and the order is further arranged according to the respective transmission moments of the PDSCHs under the condition that the BWP indexes are the same.

* * * * *